United States Patent
Chen et al.

(10) Patent No.: US 9,648,553 B2
(45) Date of Patent: May 9, 2017

(54) CELL MEASUREMENT METHOD, USER EQUIPMENT AND BASE STATION

(71) Applicant: HUAWEI TECHNOLOGIES CO., LTD., Shenzhen, Guangdong (CN)

(72) Inventors: Yuhua Chen, Shenzhen (CN); Wei Quan, Shenzhen (CN); Lixia Xue, Shenzhen (CN); Pengyu Ji, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 55 days.

(21) Appl. No.: 14/724,170

(22) Filed: May 28, 2015

(65) Prior Publication Data
US 2015/0264641 A1 Sep. 17, 2015

Related U.S. Application Data

(63) Continuation of application No. PCT/CN2012/085455, filed on Nov. 28, 2012.

(51) Int. Cl.
| H04W 48/16 | (2009.01) |
| H04W 16/24 | (2009.01) |
| H04W 36/00 | (2009.01) |
| H04W 48/12 | (2009.01) |

(52) U.S. Cl.
CPC .......... *H04W 48/16* (2013.01); *H04W 16/24* (2013.01); *H04W 36/0061* (2013.01); *H04W 48/12* (2013.01)

(58) Field of Classification Search
CPC . H04W 36/0061; H04W 16/24; H04W 48/16; H04W 48/12
See application file for complete search history.

(56) References Cited

U.S. PATENT DOCUMENTS

| 5,666,650 A | 9/1997 | Turcotte et al. |
| 2005/0130655 A1* | 6/2005 | Lundh .............. H04W 36/0083 455/434 |
| 2009/0209263 A1 | 8/2009 | Breuer et al. |
| 2010/0136969 A1 | 6/2010 | Nader et al. |

(Continued)

FOREIGN PATENT DOCUMENTS

| CN | 101159959 A | 4/2008 |
| CN | 101193399 A | 6/2008 |

(Continued)

*Primary Examiner* — Brian D Nguyen
(74) *Attorney, Agent, or Firm* — Leydig, Voit & Mayer, Ltd.

(57) ABSTRACT

The present invention provides a cell measurement method, a user equipment, and a base station. A cell measurement method according to an embodiment of the present invention includes receiving, by a user equipment, a neighbor cell list of a serving cell of a base station, wherein the neighbor cell list corresponds to a frequency, is sent by the base station, and includes a list of all neighboring cells at the frequency and information indicating whether each neighboring cell in the list of all neighboring cells can be measured by at least one of a first type of user equipment and a second type of user equipment at the frequency corresponding to the neighbor cell list. The cell measurement method also includes performing, by the user equipment, cell measurement according to the neighbor cell list.

17 Claims, 3 Drawing Sheets

```
┌─S101
a user equipment receives a neighbor cell list of a serving
cell of a base station, where the neighbor cell list
corresponds to each frequency and is sent by the base station │
               ▼
                                        ┌─S102
the user equipment performs cell measurement according to
                  the neighbor cell list
```

(56) References Cited

U.S. PATENT DOCUMENTS

| | | | |
|---|---|---|---|
| 2010/0255849 A1 | 10/2010 | Ore | |
| 2012/0270550 A1* | 10/2012 | Shi | H04W 24/02 455/436 |
| 2012/0307670 A1* | 12/2012 | Kazmi | H04W 24/10 370/252 |
| 2013/0065612 A1* | 3/2013 | Siomina | H04W 24/10 455/456.2 |
| 2013/0109372 A1* | 5/2013 | Ekici | H04W 24/02 455/422.1 |
| 2013/0130695 A1* | 5/2013 | Ryu | H04W 36/0083 455/438 |
| 2013/0183971 A1* | 7/2013 | Tamaki | H04W 36/0061 455/436 |
| 2013/0183979 A1 | 7/2013 | Chen et al. | |
| 2013/0188499 A1* | 7/2013 | Mach | H04W 48/20 370/252 |
| 2013/0315075 A1* | 11/2013 | Tamura | H04W 24/10 370/242 |

FOREIGN PATENT DOCUMENTS

| | | |
|---|---|---|
| CN | 102421119 A | 4/2012 |
| EP | 1860903 A1 | 11/2007 |
| WO | WO 00/74418 A2 | 12/2000 |

\* cited by examiner

CELL MEASUREMENT METHOD, USER EQUIPMENT AND BASE STATION

CROSS-REFERENCE TO RELATED APPLICATIONS

This application is a continuation of International Patent Application No. PCT/CN2012/085455 (WO 2014/082227), filed on Nov. 28, 2012, which is hereby incorporated by reference in its entirety.

TECHNICAL FIELD

The present invention relates to the field of wireless communications, and in particular, to a cell measurement method and to a user equipment and a base station capable of being involved in the cell measurement method.

BACKGROUND

Currently, a new carrier types (NCT) cell may be configured under a macro cell. The NCT cell may independently complete signaling interaction with a user equipment (UE) without depending on the macro cell. The NCT cell only provides service in a hot spot area within a range, and within this range, if a UE is located in the hot spot area therein, the UE may access the NCT cell to be served; if a UE is not located in the hot spot area, the UE may access the macro cell to be served. However, in the macro cell, only the UE supporting a communications standard corresponding to the NCT cell may be served by the NCT cell, while other UE (i.e. UE not supporting the communications standard corresponding to the NCT cell) cannot access the NCT cell. Similarly, for a picocell and a multimedia broadcast and multicast service (MBMS) cell, this condition exists as well, and this type of cell is called as a particular cell below.

For particular cells, some UEs do not support the communications standards of the particular cells and do not need to measure them, while other UEs support the communications standards of the particular cells and need to measure them so as to reselect these cells and to obtain a service. In an existing cell measurement method, a UE uses the same measurement policy regardless of whether the communications standards of the particular cells are supported, thus leading to unnecessary measurement.

SUMMARY

Embodiments of the present invention provide a cell measurement method, a user equipment and a base station for all UEs, which may enable different types of UEs to learn which cells need to be measured and which cells do not need to be measured, so as to avoid performing unnecessary measurement on the cells.

In a first aspect, an embodiment of the present invention provides a cell measurement method, including:

receiving, by a user equipment, a neighbor cell list of a serving cell of a base station, where the neighbor cell list corresponds to each frequency and is sent by the base station, and each neighbor cell list includes a list of neighboring cells including all neighboring cells at the frequency, and information indicating whether each neighboring cell in the list of neighboring cells can be measured by a first type of user equipment and/or a second type of user equipment at the frequency corresponding to the neighbor cell list; and performing, by the user equipment, cell measurement according to the neighbor cell list.

In a first possible implementation manner of the first aspect, when the user equipment is the first type of user equipment, the cell measurement is performed on a neighboring cell that can be measured according to the information indicating whether each neighboring cell in the list of neighboring cells in the neighbor cell list can be measured by the first type of user equipment at the frequency corresponding to the neighbor cell list; or when the user equipment is the second type of user equipment, the cell measurement is performed on a neighboring cell that can be measured according to the information indicating whether each neighboring cell in the list of neighboring cells in the neighbor cell list can be measured by the second type of user equipment at the frequency corresponding to the neighbor cell list.

In combination with the first aspect or the first possible implementation manner of the first aspect, in a second possible implementation manner, the neighbor cell list includes a first sublist, and/or, a second sublist, where the first sublist includes the list of neighboring cells, and a first blacklist of neighboring cells or a first whitelist of neighboring cells, where a neighboring cell in the first blacklist of neighboring cells cannot be measured by the first type of user equipment at the frequency corresponding to the neighbor cell list, a neighboring cell in the first whitelist of neighboring cells can be measured by the first type of user equipment at the frequency corresponding to the neighbor cell list; the second sublist includes the list of neighboring cells, and a second blacklist of neighboring cells or a second whitelist of neighboring cells, where a neighboring cell in the second blacklist of neighboring cells cannot be measured by the second type of user equipment at the frequency corresponding to the neighbor cell list, a neighboring cell in the second whitelist of neighboring cells can be measured by the second type of user equipment at the frequency corresponding to the neighbor cell list.

In combination with the first aspect or the first possible implementation manner of the first aspect, in a third possible implementation manner, the neighbor cell list includes a first sublist, and/or, a second sublist, where the first sublist includes the list of neighboring cells and a first indication information list, where each piece of indication information in the first indication information list corresponds to one neighboring cell in the list of neighboring cells, and is used for indicating whether the neighboring cell can be measured by the first type of user equipment at the frequency corresponding to the neighbor cell list; the second sublist includes the list of neighboring cells and a second indication information list, where each piece of indication information in the second indication information list corresponds to one neighboring cell in the list of all the neighboring cells, and is used for indicating whether the neighboring cell can be measured by the second type of user equipment at the frequency corresponding to the neighbor cell list.

In combination with the first aspect or the first possible implementation manner of the first aspect, in a fourth possible implementation manner, the neighbor cell list includes the list of neighboring cells, a third blacklist of neighboring cells and a third whitelist of neighboring cells, and the third blacklist of neighboring cells includes a neighboring cell in the third whitelist of neighboring cells, where a neighboring cell in the third blacklist of neighboring cells cannot be measured by the second type of user equipment at the frequency corresponding to the neighbor cell list, and a neighboring cell in the third whitelist of neighboring cells can be measured by the first type of user equipment at the frequency corresponding to the neighbor cell list.

In combination with the first aspect or the first possible implementation manner of the first aspect, in a fifth possible implementation manner, the neighbor cell list includes the list of neighboring cells, a third blacklist of neighboring cells and a third indication information list, where a neighboring cell in the third blacklist of neighboring cells cannot be measured by the second type of user equipment at the frequency corresponding to the neighbor cell list, and each piece of indication information in the third indication information list corresponds to one neighboring cell in the third blacklist of neighboring cells, and is used for indicating whether the neighboring cell can be measured by the first type of user equipment at the frequency corresponding to the neighbor cell list.

In a second aspect, the present invention provides a cell measurement method, including:

obtaining, by a base station, a neighbor cell list of a serving cell, where the neighbor cell list corresponds to each frequency, and the neighbor cell list includes a list of all neighboring cells at the frequency, and information indicating whether each neighboring cell can be measured by a first type of user equipment and/or a second type of user equipment at the frequency corresponding to the neighbor cell list; and sending, by the base station, the obtained neighbor cell list to a user equipment in the serving cell, so that the user equipment performs cell measurement according to the neighbor cell list.

In a first possible implementation manner of the second aspect, when the user equipment is the first type of user equipment, the cell measurement is performed on a neighboring cell that can be measured according to the information indicating whether each neighboring cell in the list of neighboring cells in the neighbor cell list can be measured by the first type of user equipment at the frequency corresponding to the neighbor cell list; or when the user equipment is the second type of user equipment, the cell measurement is performed on a neighboring cell that can be measured according to the information indicating whether each neighboring cell in the list of neighboring cells in the neighbor cell list can be measured by the second type of user equipment at the frequency corresponding to the neighbor cell list.

In combination with the second aspect or the first possible implementation manner of the second aspect, in a second possible implementation manner, the neighbor cell list includes a first sublist, and/or, a second sublist, where the first sublist includes the list of neighboring cells, and a first blacklist of neighboring cells or a first whitelist of neighboring cells, where a neighboring cell in the first blacklist of neighboring cells cannot be measured by the first type of user equipment at the frequency corresponding to the neighbor cell list, a neighboring cell in the first whitelist of neighboring cells can be measured by the first type of user equipment at the frequency corresponding to the neighbor cell list; the second sublist includes the list of neighboring cells, and a second blacklist of neighboring cells or a second whitelist of neighboring cells, where a neighboring cell in the second blacklist of neighboring cells cannot be measured by the second type of user equipment at the frequency corresponding to the neighbor cell list, a neighboring cell in the second whitelist of neighboring cells can be measured by the second type of user equipment at the frequency corresponding to the neighbor cell list.

In combination with the second aspect or the first possible implementation manner of the second aspect, in a third possible implementation manner, the neighbor cell list includes a first sublist, and/or, a second sublist, where the first sublist includes the list of neighboring cells and a first indication information list, where each piece of indication information in the first indication information list corresponds to one neighboring cell in the list of neighboring cells, and is used for indicating whether the neighboring cell can be measured by the first type of user equipment at the frequency corresponding to the neighbor cell list; the second sublist includes the list of neighboring cells and a second indication information list, where each piece of indication information in the second indication information list corresponds to one neighboring cell in the list of all the neighboring cells, and is used for indicating whether the neighboring cell can be measured by the second type of user equipment at the frequency corresponding to the neighbor cell list.

In combination with the second aspect or the first possible implementation manner of the second aspect, in a fourth possible implementation manner, the neighbor cell list includes the list of neighboring cells, a third blacklist of neighboring cells and a third whitelist of neighboring cells, and the third blacklist of neighboring cells includes a neighboring cell in the third whitelist of neighboring cells, where a neighboring cell in the third blacklist of neighboring cells cannot be measured by the second type of user equipment at the frequency corresponding to the neighbor cell list, and a neighboring cell in the third whitelist of neighboring cells can be measured by the first type of user equipment at the frequency corresponding to the neighbor cell list.

In combination with the second aspect or the first possible implementation manner of the second aspect, in a fifth possible implementation manner, the neighbor cell list includes the list of neighboring cells, a third blacklist of neighboring cells and a third indication information list, where a neighboring cell in the third blacklist of neighboring cells cannot be measured by the second type of user equipment at the frequency corresponding to the neighbor cell list, and each piece of indication information in the third indication information list corresponds to one neighboring cell in the third blacklist of neighboring cells, and is used for indicating whether the neighboring cell can be measured by the first type of user equipment at the frequency corresponding to the neighbor cell list.

In a third aspect, an embodiment of the present invention provides a user equipment, including:

a receiving unit, configured to receive a neighbor cell list of a serving cell of a base station, where the neighbor cell list corresponds to each frequency and is sent by the base station, and each neighbor cell list includes a list of neighboring cells including all neighboring cells at the frequency, and information indicating whether each neighboring cell in the list of neighboring cells can be measured by a first type of user equipment and/or a second type of user equipment at the frequency corresponding to the neighbor cell list; and a measuring unit, configured to perform cell measurement according to the neighbor cell list.

In a first possible implementation manner of the third aspect, when the user equipment is the first type of user equipment, the measuring unit is specifically configured to perform the cell measurement on a neighboring cell that can be measured according to the information indicating whether each neighboring cell in the list of neighboring cells in the neighbor cell list can be measured by the first type of user equipment at the frequency corresponding to the neighbor cell list; or when the user equipment is the second type of user equipment, the measuring unit is specifically configured to perform the cell measurement on a neighboring cell that can be measured according to the information indicating whether each neighboring cell in the list of neighboring cells in the neighbor cell list can be measured by the second type of user equipment at the frequency corresponding to the neighbor cell list.

In combination with the third aspect or the first possible implementation manner of the third aspect, in a second possible implementation manner, the neighbor cell list includes a first sublist, and/or, a second sublist, where the first sublist includes the list of neighboring cells, and a first blacklist of neighboring cells or a first whitelist of neighboring cells, where a neighboring cell in the first blacklist of neighboring cells cannot be measured by the first type of user equipment at the frequency corresponding to the neighbor cell list, a neighboring cell in the first whitelist of neighboring cells can be measured by the first type of user equipment at the frequency corresponding to the neighbor cell list; the second sublist includes the list of neighboring cells, and a second blacklist of neighboring cells or a second whitelist of neighboring cells, where a neighboring cell in the second blacklist of neighboring cells cannot be measured by the second type of user equipment at the frequency corresponding to the neighbor cell list, a neighboring cell in the second whitelist of neighboring cells can be measured by the second type of user equipment at the frequency corresponding to the neighbor cell list.

In combination with the third aspect or the first possible implementation manner of the third aspect, in a third possible implementation manner, the neighbor cell list includes a first sublist, and/or, a second sublist, where the first sublist includes the list of neighboring cells and a first indication information list, where each piece of indication information in the first indication information list corresponds to one neighboring cell in the list of neighboring cells, and is used for indicating whether the neighboring cell can be measured by the first type of user equipment at the frequency corresponding to the neighbor cell list; the second sublist includes the list of neighboring cells and a second indication information list, where each piece of indication information in the second indication information list corresponds to one neighboring cell in the list of all the neighboring cells, and is used for indicating whether the neighboring cell can be measured by the second type of user equipment at the frequency corresponding to the neighbor cell list.

In combination with the third aspect or the first possible implementation manner of the third aspect, in a fourth possible implementation manner, the neighbor cell list includes the list of neighboring cells, a third blacklist of neighboring cells and a third whitelist of neighboring cells, and the third blacklist of neighboring cells includes a neighboring cell in the third whitelist of neighboring cells, where a neighboring cell in the third blacklist of neighboring cells cannot be measured by the second type of user equipment at the frequency corresponding to the neighbor cell list, and a neighboring cell in the third whitelist of neighboring cells can be measured by the first type of user equipment at the frequency corresponding to the neighbor cell list.

In combination with the third aspect or the first possible implementation manner of the third aspect, in a fifth possible implementation manner, the neighbor cell list includes the list of neighboring cells, a third blacklist of neighboring cells and a third indication information list, where a neighboring cell in the third blacklist of neighboring cells cannot be measured by the second type of user equipment at the frequency corresponding to the neighbor cell list, and each piece of indication information in the third indication information list corresponds to one neighboring cell in the third blacklist of neighboring cells, and is used for indicating whether the neighboring cell can be measured by the first type of user equipment at the frequency corresponding to the neighbor cell list.

In a fourth aspect, the present invention provides a base station, including:
an obtaining unit, configured to obtain a neighbor cell list of a serving cell of the base station, where the neighbor cell list corresponds to each frequency, and the neighbor cell list includes a list of all neighboring cells at the frequency, and information indicating whether each neighboring cell can be measured by a first type of user equipment and/or a second type of user equipment at the frequency corresponding to the neighbor cell list; and
a sending unit, configured to send the obtained neighbor cell list to a user equipment in the serving cell, so that the user equipment performs cell measurement according to the neighbor cell list.

In a first possible implementation manner of the fourth aspect, the neighbor cell list includes a first sublist, and/or, a second sublist, where the first sublist includes the list of neighboring cells, and a first blacklist of neighboring cells or a first whitelist of neighboring cells, where a neighboring cell in the first blacklist of neighboring cells cannot be measured by the first type of user equipment at the frequency corresponding to the neighbor cell list, a neighboring cell in the first whitelist of neighboring cells can be measured by the first type of user equipment at the frequency corresponding to the neighbor cell list; the second sublist includes the list of neighboring cells, and a second blacklist of neighboring cells or a second whitelist of neighboring cells, where a neighboring cell in the second blacklist of neighboring cells cannot be measured by the second type of user equipment at the frequency corresponding to the neighbor cell list, a neighboring cell in the second whitelist of neighboring cells can be measured by the second type of user equipment at the frequency corresponding to the neighbor cell list.

In a second possible implementation manner of the fourth aspect, the neighbor cell list includes a first sublist, and/or, a second sublist, where the first sublist includes the list of neighboring cells and a first indication information list, where each piece of indication information in the first indication information list corresponds to one neighboring cell in the list of neighboring cells, and is used for indicating whether the neighboring cell can be measured by the first type of user equipment at the frequency corresponding to the neighbor cell list; the second sublist includes the list of neighboring cells and a second indication information list, where each piece of indication information in the second indication information list corresponds to one neighboring cell in the list of all the neighboring cells, and is used for indicating whether the neighboring cell can be measured by the second type of user equipment at the frequency corresponding to the neighbor cell list.

In a third possible implementation manner of the fourth aspect, the neighbor cell list includes the list of neighboring cells, a third blacklist of neighboring cells and a third whitelist of neighboring cells, and the third blacklist of neighboring cells includes a neighboring cell in the third whitelist of neighboring cells, where a neighboring cell in the third blacklist of neighboring cells cannot be measured by the second type of user equipment at the frequency corresponding to the neighbor cell list, and a neighboring cell in the third whitelist of neighboring cells can be measured by the first type of user equipment at the frequency corresponding to the neighbor cell list.

In a fourth possible implementation manner of the fourth aspect, the neighbor cell list includes the list of neighboring cells, a third blacklist of neighboring cells and a third indication information list, where a neighboring cell in the third blacklist of neighboring cells cannot be measured by the second type of user equipment at the frequency corresponding to the neighbor cell list, and each piece of indication information in the third indication information list corresponds to one neighboring cell in the third blacklist of neighboring cells, and is used for indicating whether the neighboring cell can be measured by the first type of user equipment at the frequency corresponding to the neighbor cell list.

In a fifth aspect, an embodiment of the present invention provides a user equipment, including:
- a transceiver, a processor and a memory, where the memory is configured to store a program code, and the processor is configured to invoke the program code in the memory in order to implement the following operations:
- receiving a neighbor cell list of a serving cell of a base station, where the neighbor cell list corresponds to each frequency and is sent by the base station, and each neighbor cell list includes a list of neighboring cells including all neighboring cells at the frequency, and information indicating whether each neighboring cell in the list of neighboring cells can be measured by a first type of user equipment and/or a second type of user equipment at the frequency corresponding to the neighbor cell list; and
- performing cell measurement according to the neighbor cell list.

In a first possible implementation manner of the fifth aspect, the operation of performing cell measurement according to the neighbor cell list is further as follows: when the user equipment is the first type of user equipment, performing the cell measurement on a neighboring cell that can be measured according to the information indicating whether each neighboring cell in the list of neighboring cells in the neighbor cell list can be measured by the first type of user equipment at the frequency corresponding to the neighbor cell list; or when the user equipment is the second type of user equipment, performing the cell measurement on a neighboring cell that can be measured according to the information indicating whether each neighboring cell in the list of neighboring cells in the neighbor cell list can be measured by the second type of user equipment at the frequency corresponding to the neighbor cell list.

In combination with the fifth aspect or the first possible implementation manner of the fifth aspect, in a second possible implementation manner, the neighbor cell list includes a first sublist, and/or, a second sublist, where the first sublist includes the list of neighboring cells, and a first blacklist of neighboring cells or a first whitelist of neighboring cells, where a neighboring cell in the first blacklist of neighboring cells cannot be measured by the first type of user equipment at the frequency corresponding to the neighbor cell list, a neighboring cell in the first whitelist of neighboring cells can be measured by the first type of user equipment at the frequency corresponding to the neighbor cell list; the second sublist includes the list of neighboring cells, and a second blacklist of neighboring cells or a second whitelist of neighboring cells, where a neighboring cell in the second blacklist of neighboring cells cannot be measured by the second type of user equipment at the frequency corresponding to the neighbor cell list, a neighboring cell in the second whitelist of neighboring cells can be measured by the second type of user equipment at the frequency corresponding to the neighbor cell list.

In combination with the fifth aspect or the first possible implementation manner of the fifth aspect, in a third possible implementation manner, the neighbor cell list includes a first sublist, and/or, a second sublist, where the first sublist includes the list of neighboring cells and a first indication information list, where each piece of indication information in the first indication information list corresponds to one neighboring cell in the list of neighboring cells, and is used for indicating whether the neighboring cell can be measured by the first type of user equipment at the frequency corresponding to the neighbor cell list;
- the second sublist includes the list of neighboring cells and a second indication information list, where each piece of indication information in the second indication information list corresponds to one neighboring cell in the list of all the neighboring cells, and is used for indicating whether the neighboring cell can be measured by the second type of user equipment at the frequency corresponding to the neighbor cell list.

In combination with the fifth aspect or the first possible implementation manner of the fifth aspect, in a fourth possible implementation manner, the neighbor cell list includes the list of neighboring cells, a third blacklist of neighboring cells and a third whitelist of neighboring cells, and the third blacklist of neighboring cells includes a neighboring cell in the third whitelist of neighboring cells, where a neighboring cell in the third blacklist of neighboring cells cannot be measured by the second type of user equipment at the frequency corresponding to the neighbor cell list, and a neighboring cell in the third whitelist of neighboring cells can be measured by the first type of user equipment at the frequency corresponding to the neighbor cell list.

In combination with the fifth aspect or the first possible implementation manner of the first aspect, in a fifth possible implementation manner, the neighbor cell list includes the list of neighboring cells, a third blacklist of neighboring cells and a third indication information list, where a neighboring cell in the third blacklist of neighboring cells cannot be measured by the second type of user equipment at the frequency corresponding to the neighbor cell list, and each piece of indication information in the third indication information list corresponds to one neighboring cell in the third blacklist of neighboring cells, and is used for indicating whether the neighboring cell can be measured by the first type of user equipment at the frequency corresponding to the neighbor cell list.

In a sixth aspect, an embodiment of the present invention provides a base station, including:
- a transceiver, a processor and a memory, where the memory is configured to store a program code, and the processor is configured to invoke the program code in the memory in order to implement the following operations:
- obtaining a neighbor cell list of a serving cell of the base station, where the neighbor cell list corresponds to each frequency, and the neighbor cell list includes a list of all neighboring cells at the frequency, and information indicating whether each neighboring cell can be measured by a first type of user equipment and/or a second type of user equipment at the frequency corresponding to the neighbor cell list; and sending the obtained neighbor cell list to a user equipment in the serving cell, so that the user equipment performs cell measurement according to the neighbor cell list.

In a first possible implementation manner of the sixth aspect, the neighbor cell list includes a first sublist, and/or, a second sublist, where the first sublist includes the list of neighboring cells, and a first blacklist of neighboring cells or a first whitelist of neighboring cells, where a neighboring cell in the first blacklist of neighboring cells cannot be measured by the first type of user equipment at the frequency corresponding to the neighbor cell list, a neighboring cell in the first whitelist of neighboring cells can be measured by the first type of user equipment at the frequency corresponding to the neighbor cell list; the second sublist includes the list of neighboring cells, and a second blacklist of neighboring cells or a second whitelist of neighboring cells, where a neighboring cell in the second blacklist of neighboring cells cannot be measured by the second type of user equipment at the frequency corresponding to the neighbor cell list, a neighboring cell in the second whitelist of neighboring cells can be measured by the second type of user equipment at the frequency corresponding to the neighbor cell list.

In a second possible implementation manner of the sixth aspect, the neighbor cell list includes a first sublist, and/or, a second sublist, where the first sublist includes the list of neighboring cells and a first indication information list, where each piece of indication information in the first indication information list corresponds to one neighboring cell in the list of neighboring cells, and is used for indicating whether the neighboring cell can be measured by the first type of user equipment at the frequency corresponding to the neighbor cell list; the second sublist includes the list of neighboring cells and a second indication information list, where each piece of indication information in the second indication information list corresponds to one neighboring cell in the list of all the neighboring cells, and is used for indicating whether the neighboring cell can be measured by the second type of user equipment at the frequency corresponding to the neighbor cell list.

In a third possible implementation manner of the sixth aspect, the neighbor cell list includes the list of neighboring cells, a third blacklist of neighboring cells and a third whitelist of neighboring cells, and the third blacklist of neighboring cells includes a neighboring cell in the third whitelist of neighboring cells, where a neighboring cell in the third blacklist of neighboring cells cannot be measured by the second type of user equipment at the frequency corresponding to the neighbor cell list, and a neighboring cell in the third whitelist of neighboring cells can be measured by the first type of user equipment at the frequency corresponding to the neighbor cell list.

In a fourth possible implementation manner of the sixth aspect, the neighbor cell list includes the list of neighboring cells, a third blacklist of neighboring cells and a third indication information list, where a neighboring cell in the third blacklist of neighboring cells cannot be measured by the second type of user equipment at the frequency corresponding to the neighbor cell list, and each piece of indication information in the third indication information list corresponds to one neighboring cell in the third blacklist of neighboring cells, and is used for indicating whether the neighboring cell can be measured by the first type of user equipment at the frequency corresponding to the neighbor cell list.

By using the cell measurement method, the user equipment and the base station provided by the present invention, different types of UEs may be enabled to respectively measure the neighboring cells according to the information indicating whether each neighboring cell in the neighbor cell list can be measured by different UEs at the frequency corresponding to the neighbor cell list, so that unnecessary measurement performed by some UEs on the particular cell not supported by the UEs is avoided, and meanwhile measurement performed by the UE needing to measure the particular cell on the particular cell is not affected.

DESCRIPTION OF EMBODIMENTS

In order to clarify technical solutions and advantages of embodiments of the present invention, a further detailed description of the technical solutions of the present invention will be given below by using of the accompanying drawings and the embodiments.

Figure 1:
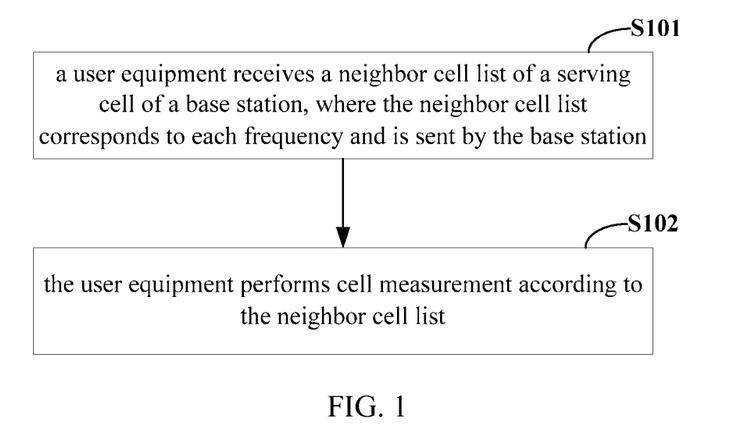
FIG. 1 is a flow chart of a cell measurement method provided by embodiment 1 of the present invention.

A cell measurement method provided by embodiment 1 of the present invention will be illustrated below in detail with FIG. 1 as an example. FIG. 1 is a flow chart of a cell measurement method provided by embodiment 1 of the present invention. The method is executed by a UE. As shown in FIG. 1, the cell measurement method provided by this embodiment includes the following steps:

Step S101, a user equipment receives a neighbor cell list of a serving cell of a base station, where the neighbor cell list corresponds to each frequency and is sent by the base station.

Each neighbor cell list includes a list of neighboring cells including all neighboring cells at the frequency, and information indicating whether each neighboring cell in the list of neighboring cells can be measured by a first type of user equipment and/or a second type of user equipment at the frequency corresponding to the neighbor cell list. The first type of user equipment is a UE supporting a communications standard of a particular cell, which means, a UE which can access the particular cell and can be served by the particular cell is the first type of UE; the second type of user equipment is a UE not supporting the communications standard of the particular cell, which means, a UE which can not access the particular cell and cannot be served by the particular cell is the second type of UE. For example, the first type of UE is a UE supporting long time evolution (LTE), and the second type of UE is a UE which is of a 2G or 3G standard and incompatible with an LTE standard; for another example, the first type of UE is a UE supporting a 3GPP R10 edition, the second type of UE is a UE supporting an edition lower than the R10 edition, and these are only used as examples here, not intended to limit the present invention.

Step 102, the user equipment performs cell measurement according to the neighbor cell list.

Specifically, when the user equipment is the first type of UE, the cell measurement is performed on a neighboring cell that can be measured according to the information indicating whether each neighboring cell in the list of neighboring cells in the neighbor cell list can be measured by the first type of UE at the frequency corresponding to the neighbor cell list; when the user equipment is the second type of UE, the cell measurement is performed on a neighboring cell that can be measured according to the information indicating whether each neighboring cell in the list of neighboring cells in the neighbor cell list can be measured by the second type of UE at the frequency corresponding to the neighbor cell list.

Therefore, different types of user equipments determine cells needing to be measured and cells not needing to be measured according to different information, so that unnecessary measurement performed by the second type of UE on a cell not supported by the second type of UE but needing to be measured by the first type of UE may be avoided, thereby avoiding electricity waste caused by the unnecessary measurement.

Optionally, the base station may separately configure neighbor cell lists for the first type of UE and the second type of UE, provide blacklists that cannot be measured by the first type of UE and the second type of UE in the neighbor cell lists and broadcast the blacklists through a serving cell to all UEs under the serving cell, to indicate cells which the UEs are prohibited to measure at each broadcasted frequency to the UEs.

For example, the base station configures a frequency list 1 (as shown in List 1) for the first type of UE, and configures a neighbor cell list for each frequency, where the neighbor cell list includes a list of neighboring cells and a first blacklist of neighboring cells, and a neighboring cell in the first blacklist of neighboring cells cannot be measured by the first type of UE at the frequency corresponding to the neighbor cell list. Similarly, the base station simultaneously configures a frequency list 2 (as shown in List 2) for the second type of UE, and configures a neighbor cell list for each frequency, where the neighbor cell list includes a list of neighboring cells and a second blacklist neighboring cells, and a neighboring cell in the second blacklist of neighboring cells cannot be measured by the second type of UE at the frequency corresponding to the neighbor cell list. The list of neighboring cells may include a cell reselection parameter, such as a physical cell identifier, a reselection offset or the like, and this is not limited in the embodiment of the present invention.

List 1

List 2

The serving cell broadcasts the frequency list 1 and the frequency list 2. If a UE is the first type of UE, the UE may receive the frequency list 1 and measure other cells excluding cells in the first blacklist of neighboring cells at each broadcasted frequency. If a UE is the second type of UE, the UE may receive the frequency list 2 and measure other cells excluding cells in the second blacklist of neighboring cells at each broadcasted frequency. Of course, if a UE is the first type of UE, the UE may simultaneously receive the frequency list 1 and the frequency list 2, in this case, identification information may be added in the frequency list 1 for identifying that the first type of UE reads the frequency list 1 and performs cell measurement according to the frequency list 1, namely, measures other cells excluding the cells in the first blacklist of neighboring cells. Therefore, different types of UEs may determine cells needing to be measured and cells not needing to be measured according to different information, thereby avoiding electricity waste caused by unnecessary measurement.

It should be noted that, if the serving cell performs intra-frequency broadcasting, only one frequency is involved in the neighbor cell list, so the frequency list does not need to be broadcasted, and only one neighbor cell list at the frequency is broadcasted. In addition, in order to distinguish the neighbor cell list for the first type of UE (e.g., the neighbor cell list in List 1) and the neighbor cell list for the second type of UE (e.g., the neighbor cell list in List 2), the neighbor cell list for the first type of UE and the neighbor cell list for the second type of UE are respectively called as a first sublist and a second sublist below.

In addition, the above-mentioned blacklist may be replaced by a whitelist, for example, the first blacklist of neighboring cells may be replaced by a first whitelist of neighboring cells, and the second blacklist of neighboring cells may be replaced by a second whitelist of neighboring cells, where a neighboring cell in the first whitelist of neighboring cells can be measured by the first type of UE at the frequency corresponding to the neighbor cell list; a neighboring cell in the second whitelist of neighboring cells can be measured by the second type of UE at the frequency corresponding to the neighbor cell list. Then, the first type of UE may only measure cells in the first whitelist of neighboring cells, and the second type of UE may only measure cells in the second whitelist of neighboring cells, thereby avoiding electricity waste caused by unnecessary measurement.

In addition, the above-mentioned blacklist may also be replaced by an indication information list, for example, the first blacklist of neighboring cells may be replaced by a first indication information list, and the second blacklist of neighboring cells may be replaced by a second indication information list, where each piece of indication information in the first indication information list corresponds to one neighboring cell in the list of neighboring cells, and is used for indicating whether the neighboring cell can be measured by the first type of UE at the frequency corresponding to the neighbor cell list; each piece of indication information in the second indication information list corresponds to one neighboring cell in the list of all the neighboring cells, and is used for indicating whether the neighboring cell can be measured by the second type of UE at the frequency corresponding to the neighbor cell list. Then, the first type of UE may only measure a cell that can be measured and is indicated by the first indication information list, and the second type of UE may only measure a cell that can be measured and is indicated by the second indication information list, thereby avoiding electricity waste caused by unnecessary measurement. For example, the list of neighboring cells includes cells 1, 2, 3 and 4, each piece of indication information in the corresponding indication information list is an indicating bit with a value "0" or "1" (where, "0" represents a cell cannot be measured, and "1" represents a cell can be measured; of course, vice versa, and this is not limited in the embodiment of the present invention), if the first indication information list is "1", "0", "1", "0", and the second indication information list is "0", "1", "1", "0", the first type of UE only measures the cells 1 and 3, and the second type of UE only measures the cells 2 and 3.

Optionally, the base station may broadcast the neighbor cell lists configured for the first type of UE and the second type of UE, namely, the first sublist and the second sublist, by integrating them in one list. As shown in List 3, the neighbor cell list includes the first sublist and the second sublist.

It should be noted that, the neighbor cell list in List 3 is only for one frequency, if the serving cell broadcasts a message at different frequencies, the base station may send one neighbor cell list for each frequency, for example, similar to List 1 and List 2, the neighbor cell lists are integrated into one frequency list, which will not be repeated redundantly herein.

List 3

In this case, identification information may be added in the first sublist and the second sublist, for indicating that the first type of UE reads the first sublist and the second type of UE reads the second sublist, so that the first type of UE and the second type of UE respectively perform cell measurement according to sublist information read by themselves, and the measurement process is the same as List 1 and List 2, and will not be repeated redundantly herein.

Similarly, the blacklist in List 3 may also be replaced by a whitelist or an indication information list, which will not be repeated redundantly herein.

Optionally, the neighbor cell list sent by the base station may also be as shown in List 4, including: a list of neighboring cells, a third blacklist of neighboring cells and a third whitelist of neighboring cells.

List 4

The third blacklist of neighboring cells includes a neighboring cell in the third whitelist of neighboring cells, where a neighboring cell in the third blacklist of neighboring cells cannot be measured by the second type of UE at the frequency corresponding to the neighbor cell list, and a neighboring cell in the third whitelist of neighboring cells can be measured by the first type of UE at the frequency corresponding to the neighbor cell list.

After receiving the neighbor cell list, the second type of UE measures a neighboring cell according to the list of neighboring cells and the third blacklist of neighboring cells in the neighbor cell list; after receiving the neighbor cell list, the first type of UE measures a neighboring cell according to the list of neighboring cells, the third blacklist of neighboring cells and the third whitelist of neighboring cells in the neighbor cell list.

For example, neighboring cells in the list of neighboring cells in the neighbor cell list are cells 1-10, the third backlist of neighboring cells includes the cell 1, the cell 2, the cell 3, the cell 4 and the cell 5, and the third whitelist of neighboring cells includes the cell 2 and the cell 3. The second type of UE may learn, according to the list of neighboring cells and the third backlist of neighboring cells, to measure the cells 6-10 and not to measure the cells 1-5; the first type of UE may learn, according to the list of neighboring cells, the third whitelist of neighboring cells and the third backlist of neighboring cells, to measure the cells 2-3 and the cells 6-10 and not to measure the cell 1, the cell 4 and the cell 5.

After a UE receives the above-mentioned neighbor cell list, if the UE is the second type of UE, unnecessary measurement on a cell not supported by the UE may be avoided, if the UE is the first type of UE, its measurement on a particular cell is not affected. Moreover, duplicate information may be avoided in the above-mentioned neighbor cell list by using the third whitelist of neighboring cells, so that a length of the sublist is decreased, and resources can be saved.

Similarly, the neighbor cell list in List 4 is only for one frequency, if the serving cell broadcasts a message at different frequencies, the base station may send one neighbor cell list for each frequency, for example, similar to List 1 and List 2, the neighbor cell lists are integrated into one frequency list, which will not be repeated redundantly herein.

Optionally, the neighbor cell list may also be as shown in table 5, including: a list of neighboring cells, a third blacklist of neighboring cells and a third indication information list.

List 5

A neighboring cell in the third blacklist of neighboring cells cannot be measured by the second type of UE at the frequency corresponding to the neighbor cell list, and each piece of indication information in the third indication information list corresponds to one neighboring cell in the third blacklist of neighboring cells, and is used for indicating whether the neighboring cell can be measured by the first type of UE at the frequency corresponding to the neighbor cell list. For example, the indication information is "1" or "0", when the indication information is "1", the neighboring cell corresponding to the indication information cannot be measured by the first type of UE, and when the indication information is "0", the neighboring cell corresponding to the indication information can be measured by the first type of UE. Of course, vice versa, and this is not limited in the embodiment of the present invention.

After receiving the neighbor cell list, the second type of UE measures a neighboring cell according to the list of neighboring cells and the third blacklist of neighboring cells in the neighbor cell list; after receiving the neighbor cell list, the first type of UE measures a neighboring cell according to the list of neighboring cells, the third blacklist of neighboring cells and the third indication information list in the neighbor cell list.

For example, neighboring cells in the list of neighboring cells in the neighbor cell list are cells 1-10, the third backlist of neighboring cells includes the cell 1, the cell 2, the cell 3, the cell 4 and the cell 5, the indication information corresponding to the cell 2 and the cell 3 in the third indication information list is 0, and the indication information corresponding to the cell 1, the cell 4 and the cell 5 is 1. The second type of UE may learn, according to the list of neighboring cells and the third backlist of neighboring cells, to measure the cells 6-10 and not to measure the cells 1-5; the first type of UE may learn, according to the list of neighboring cells, the third blacklist of neighboring cells and the third indication information list, to measure the cells 2-3 and the cells 5-10 and not to measure the cell 1, the cell 4 and the cell 5.

After a UE receives the above-mentioned neighbor cell list, if the UE is the second type of UE, unnecessary measurement on a cell not supported by the UE may be avoided, if the UE is the first type of UE, its measurement on a particular cell is not affected. Moreover, duplicate information may be avoided in the above-mentioned neighbor cell list by using the third indication information list, so that information quantity of the sublist is decreased, and resources can be saved.

By using the cell measurement method provided by this embodiment, the first type of UE and the second type of UE respectively measure a neighboring cell according to different information in the neighbor cell list, unnecessary measurement performed by the second type of UE on a particular cell not supported by the second type of UE is effectively avoided, and meanwhile measurement performed by the first type of UE on the particular cell is not affected.

Figure 2:
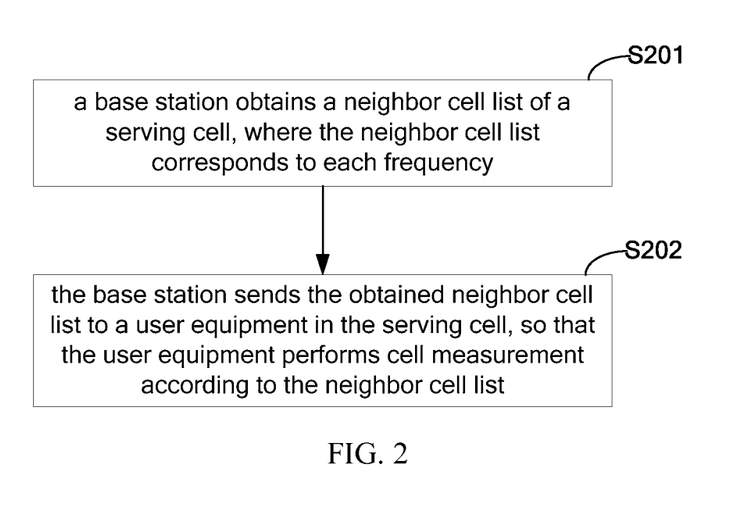
FIG. 2 is a flow chart of another cell measurement method provided by embodiment 2 of the present invention.

Another cell measurement method provided by embodiment 2 of the present invention will be illustrated below in detail with FIG. 2 as an example. FIG. 2 is a flow chart of another cell measurement method provided by embodiment 2 of the present invention. The method is executed by a base station. As shown in FIG. 2, the cell measurement method provided by this embodiment includes the following steps:

Step 201, a base station obtains a neighbor cell list of a serving cell, where the neighbor cell list corresponds to each frequency.

The neighbor cell list includes a list of all neighboring cells at the frequency, and information indicating whether each neighboring cell can be measured by a first type of UE and/or a second type of UE at the frequency corresponding to the neighbor cell list.

The neighbor cell list is configured by an operation administration and maintenance (OAM) system, or obtained by the base station by interacting with a neighboring cell base station.

Step S202, the base station sends the obtained neighbor cell list to a user equipment in the serving cell, so that the user equipment performs cell measurement according to the neighbor cell list.

Specifically, when the user equipment is the first type of UE, the user equipment performs the cell measurement on a neighboring cell that can be measured according to the information indicating whether each neighboring cell in the list of neighboring cells in the neighbor cell list can be measured by the first type of UE at the frequency corresponding to the neighbor cell list; when the user equipment is the second type of UE, the user equipment performs the cell measurement on a neighboring cell that can be measured according to the information indicating whether each neighboring cell in the list of neighboring cells in the neighbor cell list can be measured by the second type of UE at the frequency corresponding to the neighbor cell list.

The base station sends the neighbor cell list including the information indicating whether the neighboring cell can be measured by the first type of UE and/or the second type of UE to the UE in the serving cell, so that different types of user equipments determine cells needing to be measured and cells not needing to be measured according to different information, thereby avoiding unnecessary measurement performed by the second type of UE on a cell not supported by the second type of UE but needing to be measured by the first type of UE.

Optionally, the neighbor cell list sent by the base station is as shown in List 1 and List 2, including a first sublist and a second sublist.

The first sublist includes a list of neighboring cells and a first blacklist of neighboring cells, where a neighboring cell in the first blacklist of neighboring cells cannot be measured by the first type of UE at the frequency corresponding to the neighbor cell list. The second sublist includes a list of neighboring cells and a second blacklist of neighboring cells, where a neighboring cell in the second blacklist of neighboring cells cannot be measured by the second type of UE at the frequency corresponding to the neighbor cell list.

After receiving the neighbor cell list, different UEs read corresponding sublists according to their own configuration. The first type of UE reads the first sublist, then the first type of UE may learn, according to the list of neighboring cells and the first blacklist of neighboring cells, that neighboring cells in the first blacklist of neighboring cells do not need to be measured and only neighboring cells excluding the neighboring cells in the first blacklist of neighboring cells in the list of neighboring cells need to be measured; the second type of UE reads the second sublist, then the second type of UE may learn, according to the list of neighboring cells and the second blacklist of neighboring cells, that neighboring cells in the second blacklist of neighboring cells do not need to be measured and only neighboring cells excluding the neighboring cells in the second blacklist of neighboring cells in the list of neighboring cells need to be measured.

In addition, the neighbor cell list sent by the base station may also be as shown in List 3, simultaneously including a first sublist and a second sublist.

Optionally, the first blacklist of neighboring cells may be replaced by a first whitelist of neighboring cells or a first indication information list, where a neighboring cell in the first whitelist of neighboring cells can be measured by the first type of UE at the frequency corresponding to the neighbor cell list, and each piece of indication information in the first indication information list corresponds to one neighboring cell in the list of neighboring cells, and is used for indicating whether the neighboring cell can be measured by the first type of UE at the frequency corresponding to the neighbor cell list.

Similarly, the second blacklist of neighboring cells may be replaced by a second whitelist of neighboring cells or a second indication information list, where a neighboring cell in the second whitelist of neighboring cells can be measured by the second type of UE at the frequency corresponding to the neighbor cell list, and each piece of indication information in the second indication information list corresponds to one neighboring cell in the list of neighboring cells, and is used for indicating whether the neighboring cell can be measured by the second type of UE at the frequency corresponding to the neighbor cell list.

Therefore, after the base station sends the above-mentioned neighbor cell list to the UE in the serving cell, the first type of UE measures a corresponding neighboring cell according to the first sublist, and the second type of UE measures a corresponding neighboring cell according to the second sublist, thereby avoiding unnecessary measurement performed by the second type of UE on a cell not supported by the second type of UE but needing to be measured by the first type of UE.

Optionally, the neighbor cell list sent by the base station is as shown in List 4, including a list of neighboring cells, a third blacklist of neighboring cells and a third whitelist of neighboring cells.

After receiving the neighbor cell list, the second type of UE measures a neighboring cell according to the list of neighboring cells and the third blacklist of neighboring cells in the neighbor cell list; after receiving the neighbor cell list, the first type of UE measures a neighboring cell according to the list of neighboring cells, the third blacklist of neighboring cells and the third whitelist of neighboring cells in the neighbor cell list.

Therefore, after the base station sends the above-mentioned neighbor cell list to the UE in the serving cell, the second type of UE measures the neighboring cell according to the list of neighboring cells and the third blacklist of neighboring cells in the neighbor cell list, and the first type of UE measures the neighboring cell according to the list of neighboring cells, the third blacklist of neighboring cells and the third whitelist of neighboring cells in the neighbor cell list, so as to avoid unnecessary measurement performed by the second type of UE on a cell not supported by the second type of UE and not to affect measurement performed by the first type of UE on a particular cell. Moreover, the above-mentioned neighbor cell list may effectively decrease the length of the sublist, avoid duplicate information, thereby saving resources.

Optionally, the neighbor cell list sent by the base station is as shown in List 5, including a list of neighboring cells, a third blacklist of neighboring cells and a third indication information list.

A neighboring cell in the third blacklist of neighboring cells cannot be measured by the second type of UE at the frequency corresponding to the neighbor cell list, and each piece of indication information in the third indication information list corresponds to one neighboring cell in the third blacklist of neighboring cells, and is used for indicating whether the neighboring cell can be measured by the first type of UE at the frequency corresponding to the neighbor cell list.

Therefore, after the base station sends the above-mentioned neighbor cell list to the UE in the serving cell, the second type of UE measures a neighboring cell according to the list of neighboring cells and the third blacklist of neighboring cells in the neighbor cell list, and the first type of UE measures a neighboring cell according to the list of neighboring cells, the third blacklist of neighboring cells and the third indication information list in the neighbor cell list. According to the above-mentioned neighbor cell list, unnecessary measurement performed by the second type of UE on a cell not supported by the second type of UE may be avoided, and measurement performed by the first type of UE on a particular cell is not affected. Moreover, the above-mentioned list may effectively decrease information quantity of the sublist, avoid duplicate information in the two sublists, thereby saving resources.

By using the cell measurement method provided by this embodiment, the base station sends the neighbor cell list including the information indicating whether a neighboring cell can be measured by the first type of UE and/or the second type of UE to the UE in the serving cell, so that the first type of UE and the second type of UE respectively measure neighboring cells according to different information in the neighbor cell list, thereby effectively avoiding unnecessary measurement performed by the second type of UE on a particular cell not supported by the second type of UE, and meanwhile not affecting measurement performed by the first type of UE on the particular cell.

Figure 3:
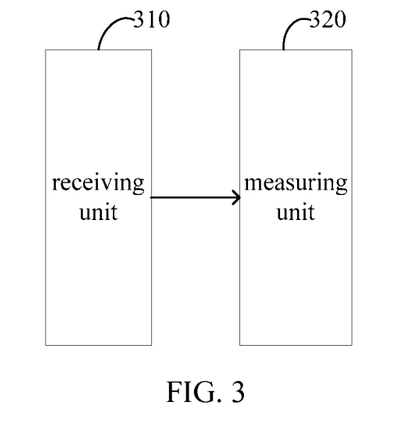
FIG. 3 is a schematic structural diagram of a user equipment provided by embodiment 3 of the present invention.

FIG. 3 is a schematic structural diagram of a user equipment provided by embodiment 3 of the present invention, and as shown in FIG. 3, the user equipment includes a receiving unit 310 and a measuring unit 320.

The receiving unit 310 is configured to receive a neighbor cell list of a serving cell of a base station, where the neighbor cell list corresponds to each frequency and sent by the base station.

Each neighbor cell list includes a list of neighboring cells including all neighboring cells at the frequency, and information indicating whether each neighboring cell in the list of neighboring cells can be measured by a first type of user equipment and/or a second type of user equipment at the frequency corresponding to the neighbor cell list. The first type of user equipment is a UE supporting a communications standard of a particular cell, which means, a UE which can access the particular cell and can be served by the particular cell is the first type of UE; the second type of user equipment is a UE not supporting the communications standard of the particular cell, which means, a UE which cannot access the particular cell and cannot be served by the particular cell is the second type of UE. For example, the first type of UE is a UE supporting long time evolution (LTE), and the second type of UE is a UE which is of a 2G or 3G standard and incompatible with an LTE standard; for another example, the first type of UE is a UE supporting a 3GPP R10 edition, the second type of UE is a UE supporting an edition lower than the R10 edition, and these are only used as examples here, not intended to limit the present invention.

The measuring unit 320 is configured to perform cell measurement according to the neighbor cell list.

Specifically, when the user equipment is the first type of UE, the measuring unit 320 is configured to perform the cell measurement on a neighboring cell that can be measured according to the information indicating whether each neighboring cell in the list of neighboring cells in the neighbor cell list can be measured by the first type of UE at the frequency corresponding to the neighbor cell list; or when the user equipment is the second type of UE, the measuring unit 320 is configured to perform the cell measurement on a neighboring cell that can be measured according to the information indicating whether each neighboring cell in the list of neighboring cells in the neighbor cell list can be measured by the second type of UE at the frequency corresponding to the neighbor cell list.

Optionally, the neighbor cell list sent by the base station is as shown in List 1 and List 2, including a first sublist and a second sublist.

The first sublist includes a list of neighboring cells and a first blacklist of neighboring cells, where a neighboring cell in the first blacklist of neighboring cells cannot be measured by the first type of UE at the frequency corresponding to the neighbor cell list. The second sublist includes a list of neighboring cells and a second blacklist of neighboring cells, where a neighboring cell in the second blacklist of neighboring cells cannot be measured by the second type of UE at the frequency corresponding to the neighbor cell list.

In addition, the neighbor cell list sent by the base station may also be as shown in List 3, simultaneously including a first sublist and a second sublist.

Optionally, the first blacklist of neighboring cells may be replaced by a first whitelist of neighboring cells or a first indication information list, where a neighboring cell in the first whitelist of neighboring cells can be measured by the first type of UE at the frequency corresponding to the neighbor cell list, and each piece of indication information in the first indication information list corresponds to one neighboring cell in the list of neighboring cells, and is used for indicating whether the neighboring cell can be measured by the first type of UE at the frequency corresponding to the neighbor cell list. Similarly, the second blacklist of neighboring cells may be replaced by a second whitelist of neighboring cells or a second indication information list, where a neighboring cell in the second whitelist of neighboring cells can be measured by the second type of UE at the frequency corresponding to the neighbor cell list, and each piece of indication information in the second indication information list corresponds to one neighboring cell in the list of neighboring cells, and is used for indicating whether the neighboring cell can be measured by the second type of UE at the frequency corresponding to the neighbor cell list.

Optionally, the neighbor cell list sent by the base station is as shown in List 4, including a list of neighboring cells, a third blacklist of neighboring cells and a third whitelist of neighboring cells.

The third blacklist of neighboring cells includes a neighboring cell in the third whitelist of neighboring cells, where a neighboring cell in the third blacklist of neighboring cells cannot be measured by the second type of UE at the frequency corresponding to the neighbor cell list, and a neighboring cell in the third whitelist of neighboring cells can be measured by the first type of UE at the frequency corresponding to the neighbor cell list.

Optionally, the neighbor cell list sent by the base station is as shown in List 5, including a list of neighboring cells, a third blacklist of neighboring cells and a third indication information list.

A neighboring cell in the third blacklist of neighboring cells cannot be measured by the second type of UE at the frequency corresponding to the neighbor cell list, and each piece of indication information in the third indication information list corresponds to one neighboring cell in the third blacklist of neighboring cells, and is used for indicating whether the neighboring cell can be measured by the first type of UE at the frequency corresponding to the neighbor cell list.

By using the user equipment provided by this embodiment, the neighboring cell is measured according to the neighbor cell list including the information indicating whether a neighboring cell can be measured by the first type of UE and/or the second type of UE, so that the first type of UE and the second type of UE respectively measure neighboring cells according to different information in the neighbor cell list, unnecessary measurement performed by the second type of UE on a particular cell not supported by the second type of UE is effectively avoided, and meanwhile measurement performed by the first type of UE on the particular cell is not affected.

In hardware implementation, the above-mentioned receiving unit 310 may be a receiver or a transceiver, the receiving unit 310 may be integrated in a receiving and sending unit, and the corresponding hardware implementation is the transceiver. The above-mentioned measuring unit 320 may be embedded in or dependent from a processor of the user equipment in a hardware form, and may also be stored in a memory of the user equipment in a software form, which is invoked by a processor to implement corresponding operations of the above-mentioned modules. The processor may be a central processing unit (CPU), a microprocessor, a single-chip microcomputer and the like.

Figure 4:
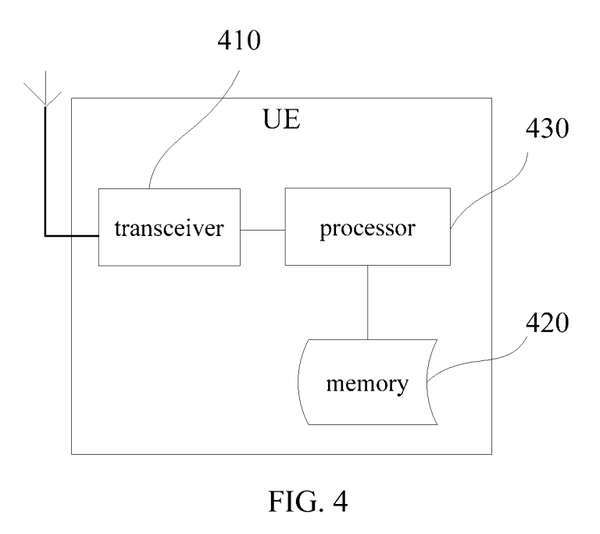
FIG. 4 is a schematic structural diagram of a user equipment provided by embodiment 4 of the present invention.

As shown in FIG. 4, which is a schematic structural diagram of a user equipment provided by embodiment 4 of the present invention. The user equipment includes a transceiver 410, a memory 420 and a processor 430 connected with the transceiver 410 and the memory 420. Of course, the user equipment may further include universal components such as an antenna, a base band processing component, a medium radio frequency processing component, an input and output apparatus and the like, and this is not limited in the embodiment of the present invention.

A group of program code is stored in the memory 420, and the processor 430 is configured to invoke the program code stored in the memory 420 for implementing the following operations:

receiving a neighbor cell list of a serving cell of a base station, where the neighbor cell list corresponds to each frequency and is sent by the base station, and each neighbor cell list includes a list of neighboring cells including all neighboring cells at the frequency, and information indicating whether each neighboring cell in the list of neighboring cells can be measured by a first type of user equipment and/or a second type of user equipment at the frequency corresponding to the neighbor cell list;

performing cell measurement according to the neighbor cell list.

Specifically, when the user equipment is the first type of user equipment, the operation of performing cell measurement according to the neighbor cell list is specifically as follows: performing the cell measurement on a neighboring cell that can be measured according to the information indicating whether each neighboring cell in the list of neighboring cells in the neighbor cell list can be measured by the first type of user equipment at the frequency corresponding to the neighbor cell list; or when the user equipment is the second type of user equipment, the operation of performing cell measurement according to the neighbor cell list is specifically as follows: performing the cell measurement on a neighboring cell that can be measured according to the information indicating whether each neighboring cell in the list of neighboring cells in the neighbor cell list can be measured by the second type of user equipment at the frequency corresponding to the neighbor cell list.

It should be noted that, the user equipment as shown in FIG. 3 and FIG. 4 may be used for implementing the cell measurement method in embodiment 1, the description of the neighbor cell list is the same as that in the cell measurement method in embodiment 1, and will not be repeated redundantly herein.

Figure 5:
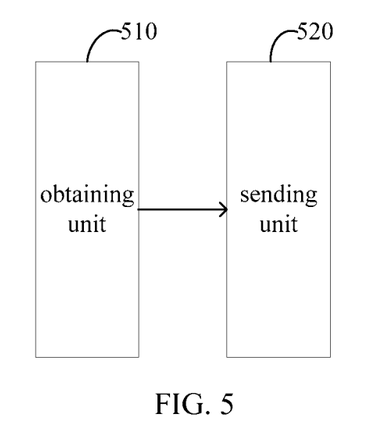
FIG. 5 is a schematic structural diagram of a base station provided by embodiment 5 of the present invention.

FIG. 5 is a schematic structural diagram of a base station provided by embodiment 5 of the present invention, and as shown in FIG. 5, the base station includes an obtaining unit 510 and a sending unit 520.

The obtaining unit 510 is configured to obtain a neighbor cell list of a serving cell, where the neighbor cell list corresponds to each frequency.

The neighbor cell list includes a list of all neighboring cells at the frequency, and information indicating whether each neighboring cell can be measured by a first type of UE and/or a second type of UE at the frequency corresponding to the neighbor cell list.

The sending unit 520 is configured to send the obtained neighbor cell list to a user equipment in the serving cell, so that the user equipment performs cell measurement according to the neighbor cell list.

Specifically, when the user equipment is the first type of UE, the user equipment performs the cell measurement on a neighboring cell that can be measured according to the information indicating whether each neighboring cell in the list of neighboring cells in the neighbor cell list can be measured by the first type of UE at the frequency corresponding to the neighbor cell list; when the user equipment is the second type of UE, the user equipment performs the cell measurement on a neighboring cell that can be measured according to the information indicating whether each neighboring cell in the list of neighboring cells in the neighbor cell list can be measured by the second type of UE at the frequency corresponding to the neighbor cell list.

Optionally, the neighbor cell list sent by the base station may be as shown in List 1 and List 2, including a first sublist or a second sublist.

The first sublist includes a list of neighboring cells and a first blacklist of neighboring cells, where a neighboring cell in the first blacklist of neighboring cells cannot be measured by the first type of UE at the frequency corresponding to the neighbor cell list. The second sublist includes a list of neighboring cells and a second blacklist of neighboring cells, where a neighboring cell in the second blacklist of neighboring cells cannot be measured by the second type of UE at the frequency corresponding to the neighbor cell list.

In addition, the neighbor cell list sent by the base station may also be as shown in List 3, simultaneously including a first sublist and a second sublist.

Optionally, the first blacklist of neighboring cells may be replaced by a first whitelist of neighboring cells or a first indication information list, where a neighboring cell in the first whitelist of neighboring cells can be measured by the first type of UE at the frequency corresponding to the neighbor cell list, and each piece of indication information in the first indication information list corresponds to one neighboring cell in the list of neighboring cells, and is used for indicating whether the neighboring cell can be measured by the first type of UE at the frequency corresponding to the neighbor cell list. Similarly, the second blacklist of neighboring cells may be replaced by a second whitelist of neighboring cells or a second indication information list, where a neighboring cell in the second whitelist of neighboring cells can be measured by the second type of UE at the frequency corresponding to the neighbor cell list, and each piece of indication information in the second indication information list corresponds to one neighboring cell in the list of neighboring cells, and is used for indicating whether the neighboring cell can be measured by the second type of UE at the frequency corresponding to the neighbor cell list.

Optionally, the neighbor cell list sent by the base station is as shown in List 4, including a list of neighboring cells, a third blacklist of neighboring cells and a third whitelist of neighboring cells.

The third blacklist of neighboring cells includes a neighboring cell in the third whitelist of neighboring cells, where a neighboring cell in the third blacklist of neighboring cells cannot be measured by the second type of UE at the frequency corresponding to the neighbor cell list, and a neighboring cell in the third whitelist of neighboring cells can be measured by the first type of UE at the frequency corresponding to the neighbor cell list.

Optionally, the neighbor cell list sent by the base station is as shown in List 5, including a list of neighboring cells, a third blacklist of neighboring cells and a third indication information list.

A neighboring cell in the third blacklist of neighboring cells cannot be measured by the second type of UE at the frequency corresponding to the neighbor cell list, and each piece of indication information in the third indication information list corresponds to one neighboring cell in the third blacklist of neighboring cells, and is used for indicating whether the neighboring cell can be measured by the first type of UE at the frequency corresponding to the neighbor cell list.

By using the base station provided by this embodiment, the base station sends the neighbor cell list including the information indicating whether a neighboring cell can be measured by the first type of UE and/or the second type of UE to the UE in the serving cell, so that the first type of UE and the second type of UE respectively measure neighboring cells according to different information in the neighbor cell list, unnecessary measurement performed by the second type of UE on a particular cell not supported by the second type of UE is effectively avoided, and meanwhile measurement performed by the first type of UE on the particular cell is not affected.

In hardware implementation, the above-mentioned sending unit 520 may be a transmitter or a transceiver, the sending unit 520 may be integrated in a receiving and sending unit, and the corresponding hardware implementation is the transceiver. The above-mentioned obtaining unit 510 may be embedded in or dependent from a processor of the base station in a hardware form, and may also be stored in a memory of the base station in a software form, which is invoked by a processor to implement corresponding operations of the above-mentioned modules. The processor may be a central processing unit (CPU), a microprocessor, a single-chip microcomputer and the like.

Figure 6:
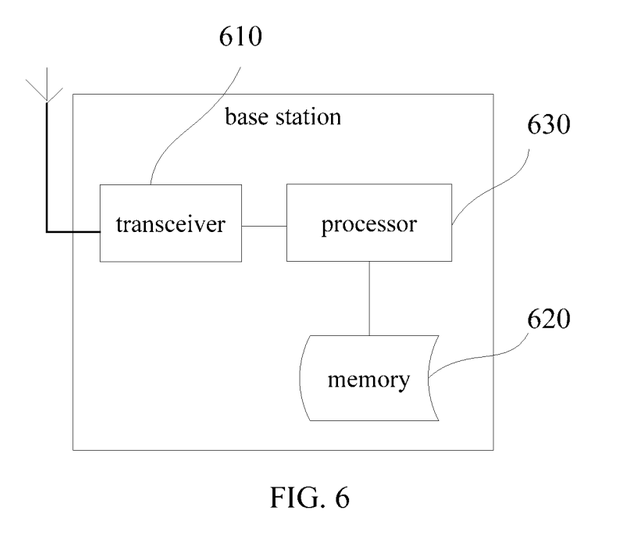
FIG. 6 is a schematic structural diagram of a base station provided by embodiment 6 of the present invention.

As shown in FIG. 6, which is a schematic structural diagram of a base station provided by embodiment 6 of the present invention. The base station includes a transceiver 610, a memory 620 and a processor 630 connected with the transceiver 610 and the memory 620. Of course, the base station may further include universal components such as an antenna, a base band processing component, a medium radio frequency processing component, an input and output apparatus and the like, and this is not limited in the embodiment of the present invention.

A group of program code is stored in the memory 620, and the processor 630 is configured to invoke the program code stored in the memory 620 for implementing the following operations:

obtaining a neighbor cell list of a serving cell of the base station, where the neighbor cell list corresponds to each frequency, and the neighbor cell list includes a list of all neighboring cells at the frequency, and information indicating whether each neighboring cell can be measured by a first type of user equipment and/or a second type of user equipment at the frequency corresponding to the neighbor cell list;

sending the obtained neighbor cell list to a user equipment in the serving cell, so that the user equipment performs cell measurement according to the neighbor cell list.

It should be noted that, the base station as shown in FIG. 5 and FIG. 6 may be used for implementing the cell measurement method in embodiment 2, the description of the neighbor cell list is the same as that in the cell measurement method in embodiment 2, and will not be repeated redundantly herein.

Those skilled in the art may be further aware that, units and algorithm steps of the examples described in the embodiments disclosed in this description may be implemented by electronic hardware, or computer software or the combination of the two. In order to clearly illustrate the interchangeability of hardware and software, the composition and the steps of the examples have been described generally in the above-mentioned illustration according to functions. Whether these functions are implemented in the form of hardware or software is determined by specific applications and design constraint conditions of the technical solutions. Those skilled may implement the described functions by using different methods for each specific application, but this implementation should not be considered beyond the scope of the present invention.

The steps of the methods or the algorithms described in the embodiments disclosed in this description may be implemented by hardware, a software module implemented by a processor or a combination of the two. The software module may be built in a random access memory (RAM), an internal memory, a read-only memory (ROM), an electrically programmable ROM, an electrically erasable programmable ROM, a register, a hard disk, a removable disk, a CD-ROM or a storage medium in any other form known in the technical field.

The above-mentioned specific implementations are used for further illustrating objectives, technical solutions and beneficial effects of the present invention in detail. It should be understood that the foregoing descriptions are merely specific implementations of the present invention, rather than limiting the protection scope of the present invention. Any modifications, equivalent substitutions, improvements or the like, made within the spirit and principle of the present invention, are all encompassed in the protection scope of the present invention.

What is claimed is:

1. A cell measurement method, comprising:
receiving, by a user equipment, a neighbor cell list of a serving cell of a base station wherein the neighbor cell list corresponds to a frequency, is sent by the base station, and includes a list of all neighboring cells at the frequency and information indicating whether each neighboring cell in the list of all neighboring cells can be measured by at least one of a first type of user equipment and a second type of user equipment at the frequency corresponding to the neighbor cell list; and
performing, by the user equipment, cell measurement according to the neighbor cell list.

2. The cell measurement method according to claim 1, wherein performing, by the user equipment, cell measurement according to the neighbor cell list, comprises:
when the user equipment is the first type of user equipment, performing the cell measurement on a neighboring cell that can be measured according to the information indicating whether each neighboring cell in the list of all neighboring cells can be measured by the first type of user equipment at the frequency corresponding to the neighbor cell list; or
when the user equipment is the second type of user equipment, performing the cell measurement on a neighboring cell that can be measured according to the information indicating whether each neighboring cell in the list of all neighboring cells can be measured by the second type of user equipment at the frequency corresponding to the neighbor cell list.

3. The method according to claim 1, wherein the neighbor cell list comprises at least one of a first sublist and a second sublist,
wherein the first sublist comprises the list of all neighboring cells and at least one of a first blacklist of neighboring cells that includes neighboring cells that cannot be measured by the first type of user equipment at the frequency corresponding to the neighbor cell list and a first whitelist of neighboring cells that includes neighboring cells that can be measured by the first type of user equipment at the frequency corresponding to the neighbor cell list, and
wherein the second sublist comprises the list of all neighboring cells and at least one of a second blacklist of neighboring cells that includes neighboring cells that cannot be measured by the second type of user equipment at the frequency corresponding to the neighbor cell list and a second whitelist of neighboring cells that includes neighboring cells that can be measured by the second type of user equipment at the frequency corresponding to the neighbor cell list.

4. The method according to claim 1, wherein the neighbor cell list comprises at least one of a first sublist and a second sublist,
wherein the first sublist comprises the list of all neighboring cells and a first indication information list including pieces of indication information, wherein each piece of indication information in the first indication information list corresponds to one neighboring cell in the list of all neighboring cells and is used for indicating whether the neighboring cell can be measured by the first type of user equipment at the frequency corresponding to the neighbor cell list, and wherein the second sublist comprises the list of all neighboring cells and a second indication information list including pieces of indication information, wherein each piece of indication information in the second indication information list corresponds to one neighboring cell in the list of all neighboring cells, and is used for indicating whether the neighboring cell can be measured by the second type of user equipment at the frequency corresponding to the neighbor cell list.

5. The method according to claim 1, wherein the neighbor cell list comprises the list of all neighboring cells, a third blacklist of neighboring cells, and a third whitelist of neighboring cells,
   wherein the third blacklist of neighboring cells comprises a neighboring cell in the third whitelist of neighboring cells,
   wherein a neighboring cell in the third blacklist of neighboring cells cannot be measured by the second type of user equipment at the frequency corresponding to the neighbor cell list, and
   wherein a neighboring cell in the third whitelist of neighboring cells can be measured by the first type of user equipment at the frequency corresponding to the neighbor cell list.

6. The method according to claim 1, wherein the neighbor cell list comprises the list of all neighboring cells, a third blacklist of neighboring cells and a third indication information list,
   wherein a neighboring cell in the third blacklist of neighboring cells cannot be measured by the second type of user equipment at the frequency corresponding to the neighbor cell list, and
   wherein each piece of indication information in the third indication information list corresponds to one neighboring cell in the third blacklist of neighboring cells, and is used for indicating whether the neighboring cell can be measured by the first type of user equipment at the frequency corresponding to the neighbor cell list.

7. A user equipment, comprising:
   a transceiver;
   a memory configured to store a program code; and
   a processor configured to execute the program code in order to:
   receive a neighbor cell list of a serving cell, of a base station, wherein the neighbor cell list corresponds to a frequency, is sent by the base station, and includes a list of all neighboring cells at the frequency and information indicating whether each neighboring cell in the list of all neighboring cells can be measured by at least one of a first type of user equipment and a second type of user equipment at the frequency corresponding to the neighbor cell list; and
   perform cell measurement according to the neighbor cell list.

8. The user equipment according to claim 7, wherein performing cell measurement according to the neighbor cell list comprises:
   when the user equipment is the first type of user equipment, performing the cell measurement on a neighboring cell that can be measured according to the information indicating whether each neighboring cell in the list of all neighboring cells can be measured by the first type of user equipment at the frequency corresponding to the neighbor cell list; or
   when the user equipment is the second type of user equipment, performing the cell measurement on a neighboring cell that can be measured according to the information indicating whether each neighboring cell in the list of all neighboring cells can be measured by the second type of user equipment at the frequency corresponding to the neighbor cell list.

9. The user equipment according to claim 7, wherein the neighbor cell list comprises at least one of a first sublist and a second sublist,
   wherein the first sublist comprises the list of all neighboring cells and at least one of a first blacklist of neighboring cells that includes neighboring cells that cannot be measured by the first type of user equipment at the frequency corresponding to the neighbor cell list and a first whitelist of neighboring cells that includes neighboring cells that can be measured by the first type of user equipment at the frequency corresponding to the neighbor cell list, and
   wherein the second sublist comprises the list of all neighboring cells and at least one of a second blacklist of neighboring cells that includes neighboring cells that cannot be measured by the second type of user equipment at the frequency corresponding to the neighbor cell list and a second whitelist of neighboring cells that includes neighboring cells that can be measured by the second type of user equipment at the frequency corresponding to the neighbor cell list.

10. The user equipment according to claim 7, wherein the neighbor cell list comprises at least one of a first sublist and a second sublist,
    wherein the first sublist comprises the list of all neighboring cells and a first indication information list including pieces of indication information, wherein each piece of indication information in the first indication information list corresponds to one neighboring cell in the list of all neighboring cells and is used for indicating whether the neighboring cell can be measured by the first type of user equipment at the frequency corresponding to the neighbor cell list, and
    wherein the second sublist comprises the list of all neighboring cells and a second indication information list including pieces of indication information, wherein each piece of indication information in the second indication information list corresponds to one neighboring cell in the list of all neighboring cells, and is used for indicating whether the neighboring cell can be measured by the second type of user equipment at the frequency corresponding to the neighbor cell list.

11. The user equipment according to claim 7, wherein the neighbor cell list comprises the list of all neighboring cells, a third blacklist of neighboring cells, and a third whitelist of neighboring cells,
    wherein the third blacklist of neighboring cells comprises a neighboring cell in the third whitelist of neighboring cells,
    wherein a neighboring cell in the third blacklist of neighboring cells cannot be measured by the second type of user equipment at the frequency corresponding to the neighbor cell list, and
    wherein a neighboring cell in the third whitelist of neighboring cells can be measured by the first type of user equipment at the frequency corresponding to the neighbor cell list.

12. The user equipment according to claim 7, wherein the neighbor cell list comprises the list of all neighboring cells, a third blacklist of neighboring cells and a third indication information list, wherein a neighboring cell in the third blacklist of neighboring cells cannot be measured by the second type of user equipment at the frequency corresponding to the neighbor cell list, and wherein each piece of indication information in the third indication information list corresponds to one neighboring cell in the third blacklist of neighboring cells, and is used for indicating whether the neighboring cell can be measured by the first type of user equipment at the frequency corresponding to the neighbor cell list.

13. A base station, comprising:
a transceiver;
a memory configured to store a program code; and
a processor configured to execute the program code in order to:
obtain a neighbor cell list of a serving cell of the base station, wherein the neighbor cell list corresponds to a frequency, and includes a list of all neighboring cells at the frequency and information indicating whether each neighboring cell in the list of all neighboring cells can be measured by at least one of a first type of user equipment and a second type of user equipment at the frequency corresponding to the neighbor cell list; and
send the obtained neighbor cell list to a user equipment in the serving cell, so that the user equipment performs cell measurement according to the neighbor cell list.

14. The base station of claim 13, wherein the neighbor cell list comprises at least one of a first sublist and a second sublist,
wherein the first sublist comprises the list of all neighboring cells and at least one of a first blacklist of neighboring cells that includes neighboring cells that cannot be measured by the first type of user equipment at the frequency corresponding to the neighbor cell list and a first whitelist of neighboring cells that includes neighboring cells that can be measured by the first type of user equipment at the frequency corresponding to the neighbor cell list, and
wherein the second sublist comprises the list of all neighboring cells and at least one of a second blacklist of neighboring cells that includes neighboring cells that cannot be measured by the second type of user equipment at the frequency corresponding to the neighbor cell list and a second whitelist of neighboring cells that includes neighboring cells that can be measured by the second type of user equipment at the frequency corresponding to the neighbor cell list.

15. The base station of claim 13, wherein the neighbor cell list comprises at least one of a first sublist and a second sublist,
wherein the first sublist comprises the list of all neighboring cells and a first indication information list including pieces of indication information, wherein each piece of indication information in the first indication information list corresponds to one neighboring cell in the list of all neighboring cells and is used for indicating whether the neighboring cell can be measured by the first type of user equipment at the frequency corresponding to the neighbor cell list, and
wherein the second sublist comprises the list of all neighboring cells and a second indication information list including pieces of indication information, wherein each piece of indication information in the second indication information list corresponds to one neighboring cell in the list of all neighboring cells, and is used for indicating whether the neighboring cell can be measured by the second type of user equipment at the frequency corresponding to the neighbor cell list.

16. The base station of claim 13, wherein the neighbor cell list comprises the list of all neighboring cells, a third blacklist of neighboring cells, and a third whitelist of neighboring cells,
wherein the third blacklist of neighboring cells comprises a neighboring cell in the third whitelist of neighboring cells,
wherein a neighboring cell in the third blacklist of neighboring cells cannot be measured by the second type of user equipment at the frequency corresponding to the neighbor cell list, and
wherein a neighboring cell in the third whitelist of neighboring cells can be measured by the first type of user equipment at the frequency corresponding to the neighbor cell list.

17. The base station of claim 13, wherein the neighbor cell list comprises the list of all neighboring cells, a third blacklist of neighboring cells and a third indication information list,
wherein a neighboring cell in the third blacklist of neighboring cells cannot be measured by the second type of user equipment at the frequency corresponding to the neighbor cell list, and
wherein each piece of indication information in the third indication information list corresponds to one neighboring cell in the third blacklist of neighboring cells, and is used for indicating whether the neighboring cell can be measured by the first type of user equipment at the frequency corresponding to the neighbor cell list.

\* \* \* \* \*